Sept. 13, 1966      K. E. HUMBERT, JR      3,272,336
LIQUID PURIFIER AND CLEANER
Filed April 5, 1965      3 Sheets-Sheet 1
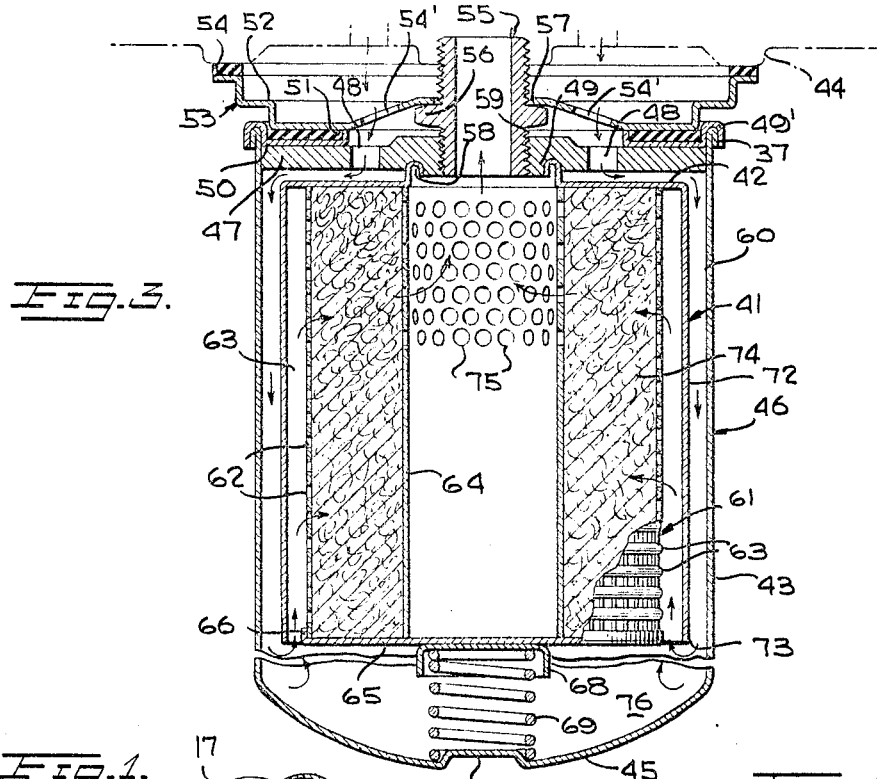
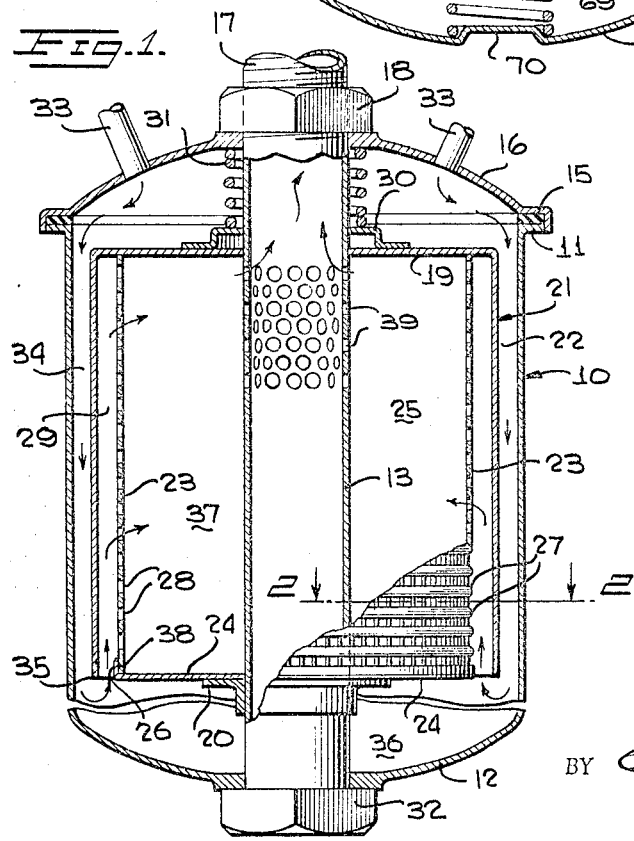
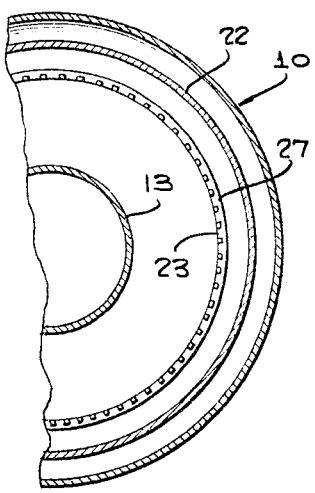
INVENTOR
Kingsley E. Humbert, Jr.
BY Shumaker and Mattare
ATTORNEYS Sept. 13, 1966   K. E. HUMBERT, JR   3,272,336
LIQUID PURIFIER AND CLEANER
Filed April 5, 1965   3 Sheets-Sheet 2
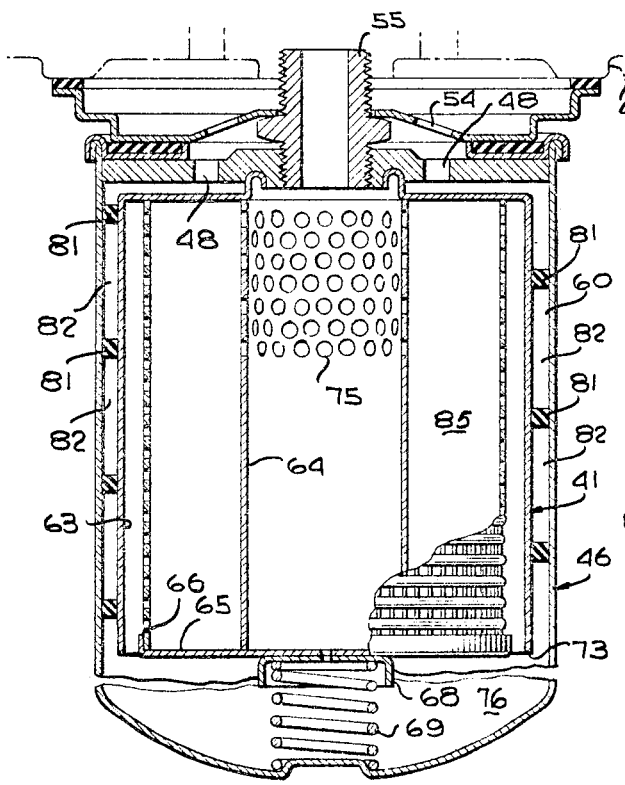
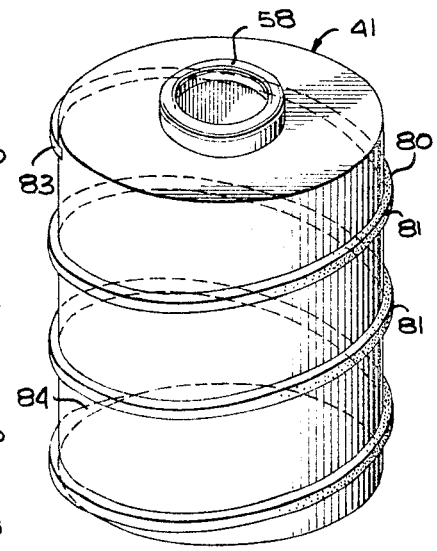
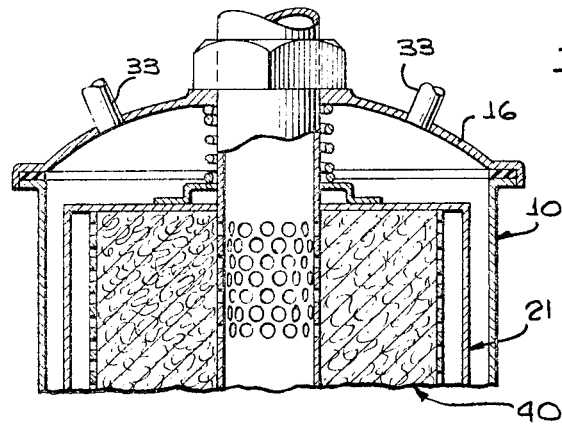
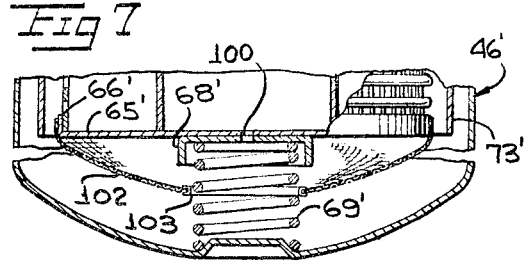
INVENTOR
*Kingsley E. Humbert, Jr.*
BY *Shoemaker and Mattare*
ATTORNEYS

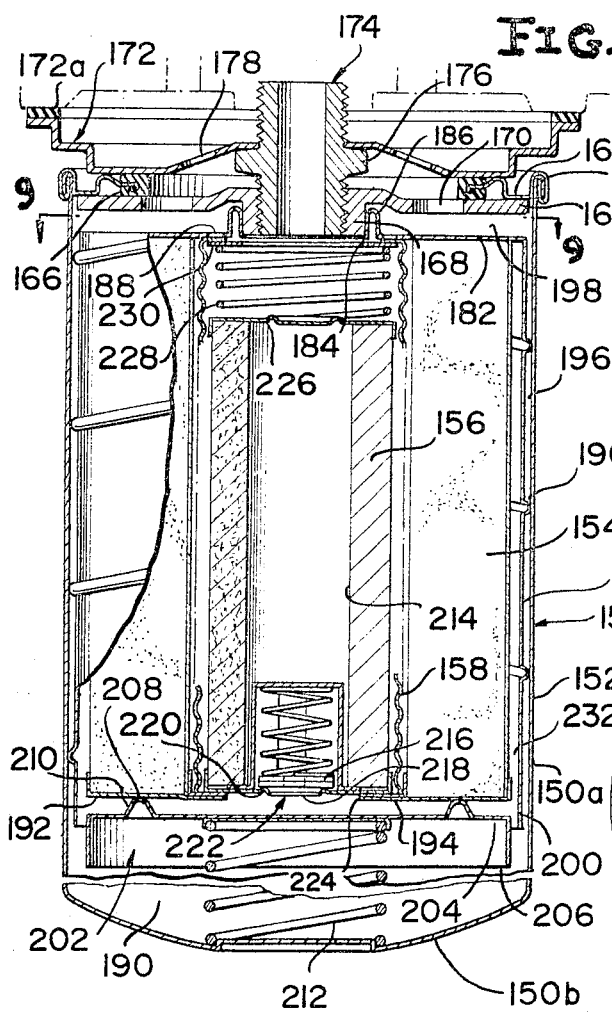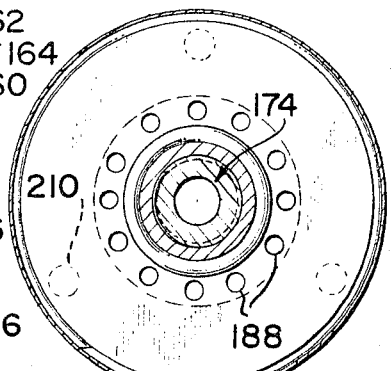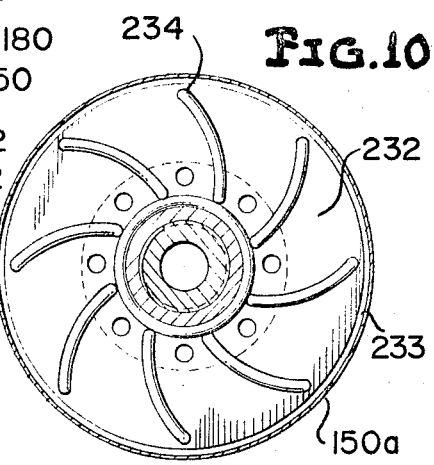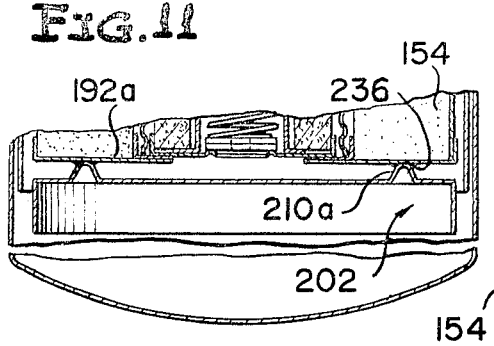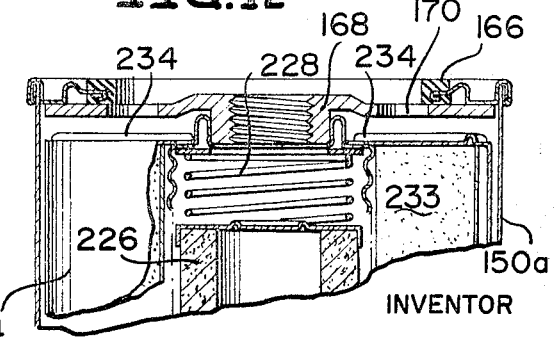

United States Patent Office 3,272,336
Patented Sept. 13, 1966

3,272,336
LIQUID PURIFIER AND CLEANER
Kingsley E. Humbert, Jr., Gastonia, N.C., assignor to Wix Corporation, Gastonia, N.C., a corporation of North Carolina
Filed Apr. 5, 1965, Ser. No. 446,789
12 Claims. (Cl. 210—132)

This application is a continuation-in-part of my application Serial No. 258,029, filed February 12, 1963, for Liquid Purifier and Cleaner, and now abandoned.

The present invention relates to a liquid purifier and more particularly to a liquid purifier that can be used with a filter.

It is an object of the present invention to provide a liquid purifier for use with internal combustion engines and the like, to purify the lubricating oils used therein and in which contaminants in the oil are removed by changing the direction of flow of the liquid passing through it.

It is a further object of the present invention to provide a liquid separator for use with internal combustion engines and the like, in which a compact housing or casing is provided so that the liquid passing therethrough may have its direction of flow abruptly changed to throw out from the main portion of liquid passing through the separator, the contaminants carried therein, so that only purified liquid exits from the housing for lubricating the engine parts.

It is another object of the present invention to provide a separator that generally extends downwardly and in which the incoming liquid passing therein has its direction of flow abruptly changed or reversed so that the heavier dirt contaminants and particles carried therein cannot quickly change its direction and are thrown into a sump whereas the liquid is purified as it can reverse its direction because its mass is lighter.

It is another object of the present invention to provide a liquid separator adapted to be used with internal combustion engines and the like in which a hollow shroud or skirt means is provided and disposed within a casing, and in which the shroud means is properly dimensioned and spaced from the inner surface of the casing, and the liquid is passed through the separator so that it changes its path of flow 180° in order to throw out from the liquid stream the heavier contaminants and dirt particles therein to produce a clean liquid which is passed out of the separator for lubricating the engine parts.

It is another object of the present invention to provide hollow shroud means disposed within a casing or a housing closely adjacent the inner wall thereof to provide an annular flow passage for incoming liquid, with a perforated member disposed within the shroud means and in communication with outlet means, so that the liquid flowing through the separator utilizes the principle of abruptly changing the direction of flow of the liquid stream to thereby throw out of the stream the heavier dirt particles and contaminants which cannot abruptly change direction as can the liquid so that they are removed therefrom.

It is another object of the present invention to provide a separator consisting of a hollow generally downwardly extending shroud member disposed within a casing and in which the liquid to be cleansed flows into the casing so that it passes between the shroud means and the casing in a generally downward direction and thereafter passes in a generally upward direction, which direction is changed 180° from its original direction of flow to thereby cause any contaminants or dirt particles therein to be thrown into the sump of the housing to thereby cleanse the liquid passed therethrough.

It is another object of the present invention to provide a liquid separator having an annular flow passage that can be properly dimensioned to produce the desired gravitational forces required to throw the dirt and other contaminants from the main flow of the liquid stream passed therethrough within the limits imposed by the application.

It is another object of the present invention to provide a liquid separator that utilizes the principle of the abrupt change of direction of the liquid passed therethrough in order to throw or cast out of the main liquid stream the unwanted dirt and contaminants carried therein, and which separator can also be used with a filter.

It has been found that in certain installations and particularly in connection with the internal combustion engine such is is used in vehicles and the like, that it is not always necessary to use a filter element or a filter cartridge therein, but that the liquid may be cleansed by a separator. It is therefore one object of the present invention to provide a novel type of separator for use with certain types of internal combustion engines for vehicles, instead of a filter cartridge to purify the lubricating oil. The purifier or separator generally consists of downwardly extending shroud means that is disposed in close spaced relationship with the inner surface of the casing or housing, and the incoming liquid is forced in an annular flow passage spirally around the shroud and downwardly in the casing and is thereafter caused to abruptly change its course or direction of flow 180°. Disposed within the shroud is a perforated member positioned closely adjacent to the inner surface of the shroud means so that the oil flows in a generally upward direction inside the shroud, and thereafter is permitted to pass through the upper portion of the perforated member and flow out of the housing. It is the abrupt change of direction or reversal of the flow of direction of the incoming oil that causes the lubricating oil in certain applications in connection with an internal combustion engine of a vehicle and the like, to be properly cleaned without the requirement of a filter element or cartridge.

It is another object of the present invention to provide a liquid separator consisting of a generally downwardly extending shroud means disposed within a conventional casing such as one used for housing a filter cartridge or element used with an internal combustion engine of a passenger car, which separator may also have disposed therein a filter cartridge so that the principle of separating the dirt or contaminant particles in the liquid passed therethrough by abruptly changing the direction of flow of the liquid may be combined and utilized with a filter cartridge or element in the housing to combine the advantages of both structures.

It is another object of the present invention to provide a liquid separator that may be readily inserted within a conventional filter housing used in connection with an internal combustion engine, and which liquid separator may be interchangeable with a filter element normally used therein, the separator being used in connection with another application, the particular or specific application of the separator or filter cartridge depending upon the specific set of circumstances and desired results.

It is another object of the present invention to provide a liquid separator for use in purifying lubricating oil and the like generally in internal combustion engines in which the liquid separator may be permanently disposed and sealed within a conventional screw-on type filter cartridge that is mounted directly on an engine block.

It is another object of the present invention to provide a liquid separator that may be readily disposed within a screw-on or spin-on type filter cartridge normally threaded directly onto the engine block of a vehicle, which liquid separator may be disposed within the conventional filter cartridge housing, in addition to the filter element without causing any interference with the operation of the filter cartridge.

It is another object of the present invention to provide a liquid separator that may be used by itself within a conventional filter housing normally used with internal combustion engines for vehicles and the like without requiring any change or alteration to the filter casing, and which liquid separator may also be used with a filter cartridge in the filter housing, and which filter housing may be of a type in which the filter cartridge and the liquid separator may be removed from the housing for replacement or cleaning.

It is still another object of the present invention to provide a liquid separator comprising shroud means that extends generally vertically within a casing so as to cause the liquid passed therethrough to abruptly change its direction of flow to cast out or throw out the heavier dirt and contaminants into a sump in the bottom of the casing to purify the liquid. Means is provided in the annular flow chamber between the liquid separator and the casing to impart a swirling and rotative action to the liquid flowing therethrough to increase the velocity of flow within the device and impart a greater centrifugal force to the liquid to increase the separation of the unwanted heavier dirt or contaminants in the liquid in the main stream.

It is another object of the present invention to provide a liquid purifier including spiral means disposed in the annular flow chamber between a liquid separator and a surrounding casing to form a flow path around the outside of the shroud of the separator to give the heavier particles a greater velocity and hence increase the centrifugal separating action when the liquid mass flowing through the casing abruptly changes its direction 180° to thereby aid the separation of the unwanted particles from the carrying medium.

It is still a further object of the invention to provide a liquid purifying apparatus including means for causing the heavier contaminant particles to be thrown downwardly into a sump, together with means for preventing turbulence in the sump which would tend to cause the contaminant particles to be sucked back into the main fluid stream passing through the apparatus.

Various other objects and advantages of the present invention will be readily apparent and understood from the following detailed description when considered in connection with the accompanying drawings forming a part thereof, and in which:

FIG. 1 is a side elevational view partly broken away and in section of a separator constructed in accordance with one embodiment of the present invention used in one type of filter casing;

FIG. 2 is a fragmentary section taken along lines 2—2 of FIG. 1;

FIG. 3 is another embodiment of the invention illustrating the liquid separator of the present invention embodied in a spin-on type filter housing directly mounted on en engine block with a filter cartridge disposed within the shroud means of the separator;

FIG. 4 illustrates, in vertical section, another embodiment of the separator of the present invention shown permanently sealed within a spin-on type throw-away housing directly mounted on an engine block;

FIG. 5 is a perspective view of the separator means embodied in FIG. 4;

FIG. 6 is a partial section of another modification of the invention similar to FIG. 1 but illustrating the liquid separator having a filter element or cartridge disposed therein;

FIG. 7 is a sectional view of the lower portion of a modified form of a separator according to the present invention including means for preventing turbulence in the sump of the casing;

FIG. 8 is a vertical sectional view through another embodiment of the invention of the spin-on type in which the centrifugal separation means is combined with concentrically associated inner and outer filter elements and wherein the shroud extends below the outer filter element and is associated with an annular baffle means.

FIG. 9 is a horizontal section taken substantially on the line 9—9 of FIG. 8 looking downwardly upon the top of the top wall of the shroud.

FIG. 10 is a sectional view corresponding generally to FIG. 9 but illustrating a modification of the structure of the top wall of the shroud providing radial arcuate ribs for imparting a spiral motion to inflowing fluid.

FIG. 11 is a sectional detail of the lower part of the filter housing or shell showing the baffle means permanently attached to the bottom cap on the outer filter element.

FIG. 12 is a section illustrating structure corresponding to the closure wall end of the filter shown in FIG. 1 and showing in side elevation the spiral ribs of FIG. 10.

Referring to FIG. 1 the reference numeral 10 designates a cylindrical casing or housing open at the top and having an outwardly extending peripheral rim 11. The bottom 12 of the housing is cup shaped and provided with a central opening therein to receive a hollow center post or bolt 13 which extends therethrough. The rim 11 has an annular resilient gasket 15 seated thereon and a cover member 16 closes off the top of the cylindrical casing 10 as clearly shown in the drawing.

The center post 13 extends completely through the casing 10 and through a central opening in the closure member 16 and has its upper end provided with threads 17 thereon, threadably engaged by a nut 18 to properly secure the top 16 and the casing 10 together in a liquid tight relationship.

The separator 21 is provided with a shroud member 22 consisting of a generally vertically downwardly extending cylindrical member having its lower end open and its top 19 closed.

A perforated member 23 also cylindrical, is disposed within shroud 22 and has its outer surface in spaced relationship with the inner surface of the shroud. Member 23 has a bottom 24 closing off access to the interior chamber 25 of the member. The bottom 24 has an upturned flange 26 around the periphery thereof that is secured by any well known means to 23. The member 23 is made of sheet metal and has a plurality of spaced circumferential or peripheral ribs 27 formed therein for strength, with the perforations 28 being formed between the ribs 27. If desired, the upturned flange 26 on the bottom member 24 may be provided with spaced radial ribs or flutes as shown in U.S. Patent 2,979,208 in contact with 23, so as to properly space the perforated member 23 with respect to the shroud 22 to permit ingress of liquid into the lower end of the separator 21, between the inner surface of shroud 22 and the exterior surface of member 23. The upper edge of the member 23 is secured to the top 19 of the separator 21 as clearly shown in FIG. 1, so that an annular flow passage 29 is provided between the perforated member 23 and shroud 22. The member 23 is preferably formed integral with top 19. The top 19 and the bottom 24 are provided with aligned metal openings therein so that the separator 21 can be mounted on the center post 13.

The separator 21 is mounted in the casing 10 so that the bottom member 24 is seated on the horizontal flange of lower collar 20. An annular member 30 is secured to the top 19 and has a central opening therein. The separator 21 is maintained in a seated relationship on the collar 20 by a spring member 31 mounted on the center post 13 between the collar member 30 and the inner surface of the cover 16.

When it is desired to install the separator 21 in the casing 10 of a conventional filter housing, the separator 21 is disposed on the center post 13 after the center post 13 has been inserted through the center opening in the bottom 12 of the casing. Thereafter, the spring member 31 is mounted on the center post above the separator 21, and the cover 16 and nut 18 are inserted over the center post. The head 32 on the bottom of the center post and the nut 18 are then gripped by wrenches and the nut 18 threaded downwardly until the cover 16 and the casing 10 provide a liquid tight relationship therebetween.

Oil inlet connections 33 are disposed in opposite sides of the cover 16 so that incoming liquid or oil will flow in the direction shown by the arrows in FIG. 1 passing uniformly around the upper end of the shroud 22 and downwardly in the annular flow passage 34 between the outer surface of the shroud 22 and the inner surface of casing 10. Thereafter the oil flows around the bottom of the lower edge 35 of the shroud 22 turning a sharp corner, and flowing upwardly in the annular space 29.

The lowermost perforations 28 in the member 23 are disposed above the lower edge 35 of the shroud so that the incoming liquid being forced through the housing will abruptly change its course of flow path 180° turning from a generally vertical downward direction, to a generally upward direction. As the mass of liquid has its direction changed, the heavier particles of dirt and contaminants in the liquid will, due to centrifugal force, be thrown downwardly into the sump designated 36 in the bottom of the housing in the space below bottom 24, while the clean liquid will pass upwardly into the open lower end of channel 29, and thereafter flow through the perforations 28 into the center portion 25 of member 23. It will be noted that the lower edge of the shroud 22 causes the liquid or oil to abruptly turn a corner because the lower end of the shroud 22 terminates below the lower extreme of the non-permeable portion 38 of the member 23. It will be noted that in this modification as well as the remaining modifications as illustrated in the drawings, the sump or bottom portion of the casing is broken away in order to enable the various figures to be made as large as possible. It will be understood that the sump portion of the casing will in fact extend downwardly below the separator a substantial distance in order to permit the collection of a relatively large amount of contaminants and to further assure that the downwardly moving stream of incoming fluid will not unduly disturb and agitate the contaminants in the bottom of the sump and that the clean fluid will have an opportunity to reverse its direction and move upwardly into the separator without entraining contaminant particles in the fluid stream.

The upper portion of the center post 13 is provided with a plurality of small perforations or holes 39 therein disposed below the top 19 and at a substantial distance above the lower end of member 23 so that the direction of flow or discharge of the clean liquid is substantially upward and out of the top of the center post.

If desired, it is of course realized that the inlet connections 33 may be disposed in the upper portion of the casing 10 adjacent to the flange 11 instead of being disposed in the cover member 16.

Thus the embodiment of the invention shown in FIG. 1 provides an annular flow passage 34 between the shroud 22 and the inner surface of the casing which can be properly dimensioned to produce the desired gravitational forces within the limits imposed by the application in which it is to be installed. It is also important to mention the fact that the separator must extend generally downwardly to be effective because of the requirement of the change of direction of the liquid flowing therethrough.

When it is desired to remove the contaminants thrown by the centrifugal action of the separator into the sump 36, the center post may be removed and the separator removed so that access to the sump 36 can be obtained and readily cleaned separately and the assembly put back together, at which time it is again ready for service.

Thus, the present invention as shown in FIG. 1 provides a separator that may be readily inserted within a conventional housing where a filter element or cartridge has been used, and in like manner, if desired, a separator may be replaced with a filter cartridge for specifically desired reasons.

Referring to the embodiment of the invention shown in FIG. 6 this is substantially the same in structure and operation as that shown in FIG. 1 except that the separator member 21 is shown provided with a fibrous mass of filtering material 40 of annular arrangement disposed within the central portion or chamber of the member 23. The fibrous filter material may consist of cotton waste, sisal or similar material, or even resin impregnated pleated paper may be inserted therein.

In operation this embodiment of the invention is substantially the same as that already described for FIG. 1, except that the filter will do a polishing effect on lubricating oil and the like. Thus in this embodiment of the invention the combination of an oil or liquid separator and a filter element as the second stage thereof is used.

Referring to the embodiment of the invention shown in FIG. 3, this differs from the already described embodiments of the invention in that it provides a separator 41 cylinder in shape with a closed top 42 and an open bottom disposed with a filter casing 43 of the spin-on or screw-on type that is directly mounted onto an engine block 44 of a passenger car and the like. The lower cup-shaped end 45 of the casing or housing 46 is closed while the upper end is open and is sealed off by a heavy cylinder plate member 47 having a plurality of oil inlet openings 48 therein disposed around a central interned threaded boss 49. The upper lip 37 of the casing 46 is secured to the complementary annular lip 49' of a thin annular retainer plate 50 in a liquid tight relationship therewith. The retainer plate has an outwardly or upwardly turned lip 51 on its inner end so that a gasket 52 may be readily inserted therein. The gasket 52 may be cemented to the plate 50 if desired, or form a press fit therewith. An adapter plate 53 that seats on an annular gasket 54 is secured to the engine block 44 by an externally threaded adaptor bushing 55. The adaptor bushing 55 is provided with a collar or nut member 56 adjacent its mid-portion. Bushing 55 threads into the engine block and has the casing 46 threadably connected thereto by the boss 49 so that the gasket 52 forms a liquid tight seal with the plate 53 to prevent any oil from leaking therebetween. The adaptor plate 53 is provided with a plurality of spaced oil inlet openings 54' therein circumferentially disposed about the adaptor bushing 55 and the central opening 57 of plate 53. The adaptor bushing 55 is threaded into complementary mating threads in the engine block, to hold the adapter plate 53 seated against the gasket 54 by virtue of the collar 56.

The casing 46 is seated upon the retainer plate 53 by threading the boss 49 onto the lower end of the bushing 55 as shown in FIG. 3 so that the gasket 50 forms a liquid tight seal with the retainer plate.

The top 42 of the separator 41 has an inwardly and upturned flange forming an annular rib 58 adjacent the central portion thereof to provide a central opening therein. The rib 58 is seated in an annular recess 59 formed in the closure member 47 around the boss 49. The rib 58 maintains the top 42 in spaced relationship with the inner surface of the plate 47 so that incoming oil may flow through ports 48 over and across the top 42 of the separator and thereafter into the annular chamber 60 formed between the outer surface of the shroud 41 and the inner surface of the casing 46.

The perforated member 61 having a plurality of perforations 62 therein with spaced ribs 63 is secured within the separator 41 in spaced relationship therewith to provide a flow channel 63 therebetween. A cylindrical center tube 64 of substantially the same diameter as the annular rib 58 is secured to top 42 within member 61, and extends between the top 42 and a lower closure member 65 having an upturned rim 66. A cup member 68 is secured to the bottom of the member 65 to receive a spring 69 therein. The lower end of the spring 69 is mounted around a protrusion or countersink 70 formed in the bottom of member 45 to properly position the separator 41 within the casing 46 so that the rib is seated in its corresponding recess 59. In this embodiment of the invention a filter element 74 is preferably formed of cotton waste, or sisal, and is disposed within the space defined by the shroud, center tube 64 and the top 42 and the bottom member 65 of the separator. The lower edge 73 of the shroud terminates below the perforated portion of member 61 so that liquid passing downwardly from channel 60 will abruptly turn a corner and reverse its direction of flow 180° passing around the outer edge 73 of the shroud to throw out the heavy dirt particles by centrifugal action that are carried in the oil stream. The clean oil will pass vertical upwardly into channel 63 and thereafter flow in an outside-in direction through the filter element 74.

It will be noted that the center tube 64 is provided with a plurality of perforations 75 therein, disposed in the extreme upper section thereof, so that the oil passing through the filter element 74 will flow in upward direction and be discharged through the adaptor bushing 55, the filter element 74 polishing the liquid and removing any contaminants not thrown out into the sump 76 of the casing disposed below plate 65 with its bottom defined by the curved member 45.

As in the previously described embodiment of the invention, the separator 41 and the shroud must extend generally downwardly to be effective because of the requirement of the change of direction in the flow of liquid being passed therethrough to utilize the centrifugal separating action. Thus, with this embodiment of the invention it is readily apparent that the oil from the engine block 44 passes through the openings 54' in the direction of the arrows indicated in FIG. 3, and thereafter through oil inlet ports 48, through annular chamber 60 around the bottom of the shroud and thence upwardly in channel 63 and out of the perforations 75 and through the adaptor bushing back to the engine to lubricate the parts thereof.

With this embodiment of the invention shown in FIG. 3 the separator has been combined with a spin-on type casing 46 that is mounted directly upon the engine block and has further been combined with a filter element 74 sealed therein to filter any contaminants or dirt that may not have been thrown out of the oil stream by centrifugal action utilized in the separator. With this combined separator and filter it is merely necessary to unthread or spin off the casing 46 from the engine block when it is desired to replace it with a fresh separator and filter cartridge and to discard the dirty casing.

Referring to the embodiment of the invention shown in FIGS. 4 and 5, it is substantially similar to that already described for FIG. 3 except that this embodiment of the invention does not contain a filter cartridge or element such as 74 in FIG. 3, and it also provides a spiral flow path around the outside of the separator and shroud 41.

On referring to FIG. 5 it will be noted that the shroud 41 is provided with a spirally wound continuous member 80 formed of rubber or any other suitable substance secured to the outside of the shroud 41 by cement or other equivalent means. Each turn or coil 81 of the spiral member 80 is disposed in spaced relationship with the next coil and is of a width substantially equal to the width of the channel 60 so that a plurality of individual annular chambers 82 are formed between the inner surface of the casing 46 and the outer surface of the shroud 41. The upper end 83 of the member 80 is provided with a gradual taper while the lower end 84 thereof also terminates in a gradual taper so that the incoming oil passing into the top of the downwardly hanging casing 46 through oil inlet ports 48, is swirled or rotated around or about the shroud 41 and channelled in successive channels 82 in sequence as it flows downwardly toward the bottom of the shroud 41 to increase its velocity, and thereby increase its centrifugal action, in throwing out the heavier particles into the sump 76 as the oil passes around the lower edge 73 of the shroud and abruptly changes its direction 180° to thereby throw the heavier masses of dirt particles into the sump because of their inability to change their direction of flow as quickly as the main body of liquid in which they are carried. The clean liquid thereafter passes upwardly into the channel 63 and through the void space 85 into the perforations 75 in the upper end of tube 64, and the clean liquid is discharged through the adaptor bushing 55 back into the engine to lubricate the parts.

In the modification illustrated in FIGS. 4 and 5, the means for imparting the swirling and rotative action to the liquid in the space between the casing and the separator has been disclosed as comprising a separate member 81 which is secured to the outside of shroud 41 and which is in sealing relationship with the inner surface of the casing. It should be understood that this means need not necessarily comprise a separate member as shown, nor does this means necessarily have to be in sealing engagement with one or the other of the shroud or casing portions. In other words, this means for producing the swirling movement of the liquid may comprise an integral rib means which may be formed either integral with the shroud or the casing, or may either be in contact with the abjacent member or spaced therefrom. In any event, regardless of the particular mode of construction of this means, it will serve to produce the desired swirling motion of the liquid which will increase the centrifugal action as previously discussed.

Referring now to FIG. 7 of the drawing, a modified form of the invention is illustrated which is similar in construction to the modification illustrated in FIG. 4, and wherein similar parts have been given the same reference numerals primed. It will be seen that the construction of the modification shown in FIG. 7 is identical with that of FIG. 4 with the exception of the provision of a central opening 100 provided through the lower wall 65' of the separator and the upper wall of the cup member 68' and in addition a flow control member 102 is provided, this flow control member being dome-shaped as illustrated and comprising a filter screen. The upper portion of member 102 is suitably secured to the upturned rim 66' of the lower closure of the separator, and a central opening 103 is provided through member 102 for receiving the biasing spring 69'.

The purpose of the hole 100 and the rate control member 102 is to reduce turbulence in the sump thereby diminishing any eddy currents which would tend to cause sediment accumulating in the sump from moving upwardly and being entrained in the stream of clean liquid.

In effect, the hole 100 serves as a bleed opening which permits a steady continuous flow of liquid downwardly from the annular chamber between the casing and the separator thence into the sump and upwardly through the small bleed opening 100.

Filter member 102 which may take the form of a filter screen as illustrated or other filter means such as a filter cloth or paper serves to control the rate of flow upwardly, and the over-all result is to provide a stabilizing flow of liquid of low velocity upwardly in the sump thereby diminishing any eddy currents in the sump and preventing the occurrence of any high speed jets of liquid which might otherwise move downwardly into the sump and agitate the sediment therein and cause it to move upwardly and be entrained in the main flow of clean liquid through the apparatus.

Thus, from the foregoing description it will be readily apparent that a novel separator has been provided which will utilize centrifugal action in order to throw out the heavier dirt particles carried in lubricating oil of an internal combustion engine for cleaning the oil by centrifugal action.

The present invention further provides a liquid separator that can be utilized in lieu of the conventional filter element or cartridge now used in a standard type casing in connection with internal combustion engines and the like.

The present invention also provides a compact liquid separator generally extending in a downward direction that has an annular flow passage that can be properly dimensioned to produce the desired gravitational forces within the limits imposed by the internal combustion engine of a vehicle.

The present invention further provides a liquid separator for purifying liquids and the like that can be used in a spin-on type throw away filter element directly mounted on an engine block, or which can be used as a housing in which the cover member is detachably connected to the main casing, and further in which a filter element or cartridge can be disposed within the separator so that it may be replaced in one instance, while in the spin-on type it may be discarded with the filter cartridge and the new spin-on casing used in its place.

In addition, the present invention provides a liquid separator having a novel arrangement used with a generally downwardly extending separator shroud in order to channel the flow of incoming oil in a swirling manner and rotate it about the shroud as it moves downwardly in sequence in the compartmented channels formed by the spiral structure disposed between the outer surface of the shroud and the inner casing, so as to increase the gravitational forces acting on the liquid to provide a greater centrifugal action to throw out the heavier dirt particles and contaminants carried in the main liquid stream.

In a modified form of the present invention means is provided in the form of a bleed opening and a flow rate control means for reducing turbulence in the sump to a minimum and preventing eddy currents from being generated which would tend to entrain settled-out contaminants into the main flow stream of clean liquid.

Referring now to FIGURES 8 and 9, the numeral 150 designates a housing for a dual filter element structure generally designated 152 and comprising the outer elongate annular filter element 154 and the elongate annular inner filter element 156. The element 154 may be of the well-known pleated paper type or may be formed of cotton waste, or sisal, similar to the element 74. This outer filter element has extending centrally therethrough the corrugated foraminous tube or cylinder 158.

The housing 150 embodies the cylindrical side wall 150a formed integrally with the outwardly domed or convex free end wall 150b.

The mounting end of the filter structure, more particularly of the housing 150, is closed by the closure plate 160, to the outer side of which is joined the end wall 162, by welding or other suitable means and this end wall is seamed to the adjacent end of the housing wall 150a, as indicated at 164.

The end wall 162 is of annular form and has an inner edge portion which is embedded in an annular sealing ring 166.

The mounting plate 160 is formed with the inturned interiorly threaded boss 168 and around this boss the plate is provided with an annular series of fluid inlet openings or ports 170. This annular group of ports 170 is within the circular area defined by the gasket 166.

The numeral 172 designates the adapter plate, corresponding to the plate 53 of FIG. 3. This plate is centrally apertured to receive the exteriorly threaded outer end of the adaptor bushing 174, the inner end portion of which is exteriorly threaded for threaded engagement in the boss 168, as shown, of the mounting plate 160.

The adaptor bushing 174 carries intermediate its ends the collar or nut member 176 as shown which engages the under side of the plate 172 and around the central opening of the plate 172 and outwardly from the nut 176, the plate has formed therein an annular or circular series of oil inlet openings 178.

As in the case of the bushing 55, the bushing 174 here illustrated in FIG. 8 is adapted to be threaded into complementary mating threads in the engine block to hold the adaptor plate 172 seated against the gasket 172a as illustrated. This construction is substantially the same as the structure shown in FIG. 3.

The outer annular filter element 154 is positioned in and concentrically of the cylindrical shroud 180 which has the end wall 182 which is positioned upon and forms an end cap for the end of the outer cylindrical element which is adjacent to the mounting plate 160. This end plate or cap 182 is formed with a central opening 184 and the material of the cap is formed around the opening to provide a collar 186 which is adapted, as shown, to tightly frictionally receive the inner end portion of the adaptor bushing 174. The cap or end wall 182 is provided around the collar with a series of by-pass ports 188 which open into the foraminous tube 158 as illustrated.

As shown, the inner filter element terminates at the end remote from the mounting plate 160, a substantial distance from the inner end wall 150b of the housing whereby there is provided the contaminant receiving sump 190.

The outer filter element 154 is closed at the inner end thereof, that is the end remote from the mounting plate 160, by the flanged end cap 192 which end cap has a central opening 194 therein and which end cap is secured to the inner end of the tube 158 and also supports within the area defined by the inner end of the tube, the inner end of the inner filter element 156.

The cylindrical wall of the shroud 180 is shaped, by pressing or other suitable means, to provide the outwardly projecting continuous spiral rib 196 which engages the inner side of the housing wall 150a whereby there is provided a continuous annular flow passage 196 between the wall of the shroud and the wall of the housing and the top end of the shroud or wall 182 is spaced from the mounting plate whereby there is provided the fluid receiving chamber 198 into which fluid enters by way of the openings or ports 170.

As illustrated, the shroud 180 is of materially greater length than the outer filter element whereby the lower end portion of the shroud projects beyond the lower or inner end of the outer filter element as indicated at 200.

Located within the inner end portion of the housing is a fluid baffle unit 202 which comprises a circular or disc head 204 joined peripherally to a circular skirt 206, the overall or outside diameter of which approximates the outside diameter of the outer filter unit, as is shown, and is of smaller diameter than the inside diameter of the lower end of the shroud.

The head 204 of the baffle unit is maintained in spaced relation with the end cap 192 of the outer filter element in a suitable manner to provide the flow space 208 by which the fluid to be filtered may pass in part or in whole to the adjacent end of the inner filter element 156. The means here illustrated for maintaining the head 204 spaced from the end cap 192 consists of the outwardly pressed portions of the head cap forming the buttons 210 which engage the end cap 192 as shown and the baffle unit is pressed into engagement with the end cap 192 by a coil spring 212 corresponding to the spring 69 of FIG. 3, which rests on the end wall 150b.

The inner annular filter element 156 has the central passage 214 therethrough which aligns with the opening 194 and this inner end of the passage or bore 214 is closed by an inwardly opening spring pressed valve 216, through the center of which a bleed aperture 218 is formed. The valve 216, in the form of a disc through which the aperture 218 is formed, engages an annular seat 220 encircling the opening 222 formed in a plate 224, which opening aligns with the passage 214 when the plate is in position against the inner end of the inner filter element as illustrated.

The passage 214 through the filter element 156 is closed at the end thereof adjacent to the mounting plate and adaptor bushing, by the plate 226 and interposed between this plate and the cap 182 is a coil spring 228 which at its end remote from the plate 226, bears against a flat annular valve gasket or washer 230 which normally maintains the pressure relief ports 188 closed during the proper normal operation of the filter structure.

In the operation of the structure shown in FIG. 8, fluid entering the chamber area 198 at the mounting end of the filter, by way of the ports 170, will flow through the spiral passage 196 to the opposite or lower end of the casing and will be discharged downwardly along the inner side of the casing wall toward the sump 190. At the bottom edge or end portion 200 of the shroud the fluid direction of flow will be completely reversed as in the hereinbefore described structures, being deflected upwardly by the baffle skirt 206 and rising or passing upwardly through the annular flow passage 232 between the inner side of the shroud and the outer side of the outer filter element 154. The fluid will then flow radially inwardly through the outer filter element, free of the major portion of contaminants which will be thrown down and deposited in the sump 190. The filtered fluid after passing through the element 154 may then flow upwardly and pass out through the adaptor bushing 174.

Slow-down of fluid flow through the element 154 will cause the fluid to open the valve 216 to flow into the passage 214 of the inner filter element through which it may pass radially outwardly or laterally into the axial passage of the outer filter element to then flow upwardly and out through the adaptor bushing.

The valve 230 is held by the spring 228 to open under full fluid pressure or at a pressure approximately twice that of the valve 216. Therefore, upon sufficient slow-down of fluid flow through the filter elements by the courses described, the fluid in-coming through the ports 170 into the chamber 198, will unseat the valve washer or gaskets 230 so that such fluid will by-pass the filter elements and flow directly to and through the adaptor bushing.

FIG. 10 illustrates another means for imparting whirling or spinning movement to the fluid entering the filter housing and passing downwardly between the shroud and the housing wall whereby to effect centrifugal removal of heavy contaminants from the fluid. In this modified construction the numeral 232 designates the top wall of the shroud which forms the cap for the outer filter element and this wall is pressed to form or is otherwise provided with the series of arcuate radially extending ribs 234. Thus, after the fluid enters the chamber 198, it will flow laterally or radially outwardly and will be given a spiral motion or movement as it flows toward the wall 150a of the housing to pass downwardly between the housing wall and the shroud wall in the annular space 233. The spiraling motion will be maintained as the fluid descends toward the sump and as the fluid passes the lower end of the shroud below the lower part of the outer filter body and impinges upon the side of the skirt portion 206 of the baffle unit its direction of flow will be quickly reversed as will be apparent and as above described and contaminating particles will be discharged into the sump.

In substitution for the spring 212 which maintains the baffle unit 202 in position with respect to the lower end of the outer filter element and within or partly within the lower end of the shroud, the baffle unit may be maintained in place by being attached directly to the end cap 192. In FIG. 11 the baffle plate shows the button elements 210a, which are substantially conical in form, having their apex portions welded as at 236 to the under surface of the cap 192a.

The button elements 210 or 210a may be in any number, it being preferred that at least three thereof be provided in the spaced relation shown in FIG. 9. However, any number of such elements may be employed or other suitable means may be provided for maintaining the baffle unit in the desired location with respect to the inner or lower end of the outer filter element.

Inasmuch as various changes may be made in the form, location and relative arrangement of the several parts without departing from the essential characteristics of the invention, it will be understood that the invention is not to be limited except by the scope of the appended claims.

I claim:

1. A liquid purifier comprising a casing having an inlet and an outlet for passing liquid therethrough, a hollow liquid separator in said casing comprising a skirt spaced from the inner wall of said casing and having a closed top and a depending cylindrical imperforate portion, the lower end of said skirt being spaced from the lower end of said casing to form a sump between the lower end of the skirt and the lower end of the casing, a perforated member disposed within and spaced from said skirt and having a closed bottom, said outlet being in communication with the interior of said perforated member, said skirt extending downwardly below the perforated portion of said perforated member whereby liquid flowing through said casing has its direction of flow reversed 180° to cause contaminants to be separated out in said sump, and a bleed means providing communication between said sump and the interior of said perforated member, said bleed means comprising an opening in the closed bottom of said perforated member having a cross sectional area substantially less than the cross sectional area of the space between said perforated member and said skirt whereby the major portion of liquid passing through the apparatus passes through said space between said perforated member and said skirt, and only a minor portion of the amount of liquid passing through the apparatus passes through said bleed means so as to produce a substantially steady continuous flow of liquid from said sump to the interior of said perforated member for reducing turbulence in the sump.

2. Apparatus as defined in claim 1, including flow rate control means comprising a filter element extending below the closed bottom of said perforated member for controlling the rate of flow of liquid from said sump upwardly and through said bleed means.

3. A spin-on throw-away liquid purifier comprising a cylindrical casing, a closure member for one end thereof having a threaded central boss for connection to an internal combustion engine and forming an outlet, liquid inlet means in said closure member and disposed around said boss, a liquid separator sealed in said casing and comprising a cylindrical body having a closed top and an open bottom, said cylindrical body forming a shroud depending from said top and extending downwardly in and concentric with the casing, there being a space between the casing wall and the shroud forming a downwardly extending flow passage, the lower end of the shroud being spaced from the lower end of said casing and forming a sump therebelow, an elongate cylindrical annular filter unit within and spaced from said cylindrical shroud, the top having a central opening leading to said outlet and having annular means around said opening in fluid tight sealing connection with and around said boss, said filter unit having an axial passage communicating with said outlet through said central opening of said top, the bottom of said filter unit having a central opening leading into the lower end of said axial passage, means for closing off said opening in the bottom of said filter unit, said shroud extending at its lower end a substantial distance below the bottom of said filter unit, said top being spaced from said closure member and forming a chamber receiving liquid from said inlet means, a baffle unit having a disc head below and spaced from said bottom of the filter unit and of smaller diameter than and positioned within the lower end of said shroud, said baffle unit head carrying a depending skirt portion extending below the bottom of and spaced from said shroud, means carried by said cylindrical body for imparting a spiral centrifugal movement to fluid flowing downwardly through said flow passage from said chamber to the lower end of the shroud, means whereby the liquid is impelled to reverse its direction of flow below the shroud to effect discharge of contaminants therefrom into the sump and to then flow in part upwardly between the filter and the shroud to pass radially inwardly through the filter to said axial passage and to flow in part to the central opening in said bottom of the filter unit and into the lower end of said axial passage for exit through said outlet.

4. The invention according to claim 3 wherein said means for closing off said opening in the bottom of said filter unit comprises a valve means in the lower end of said axial passage adapted to open under fluid pressure in the direction of said outlet, and a pressure relief valve means for admitting fluid directly from said liquid inlet means into said outlet, the second mentioned valve means operating to open under a higher pressure than the said valve means in the lower end of said axial passage.

5. The invention according to claim 3, wherein said means for imparting spiral centrifugal movement to fluid flowing downwardly through said flow passage comprises a spiral rib exteriorly of and surrounding said shroud and forming an integral outwardly projecting portion of the shroud and substantially contacting the inner surface of the wall of the casing.

6. The invention as defined by claim 3, wherein said means for imparting spiral centrifugal movement to fluid flowing through said flow passage comprises a longitudinally arcuate series of upstanding ribs each having opposite concave and convex sides upon said closed top of the cylindrical body and disposed in a circular arrangement around and extending radially outwardly of said annular means and having said fluid tight sealing connection with and around said boss and with the concave sides of the ribs facing and spaced from the convex sides of adjacent ribs.

7. The invention as defined by claim 3, with an inner elongate annular filter body having an axial passage therethrough and positioned within said axial passage of the first mentioned annular filter, said central opening in the bottom of the first mentioned filter unit being in communication with the lower end of the axial passage through said inner filter body, said means for closing off the opening in the bottom of said first mentioned filter unit comprising a valve positioned in the lower end of the axial passage of the inner filter body, means closing the top end of the axial passage of the inner filter body, and a second valve means including an actuating spring means between said means closing the top end of the axial passage of the inner filter body and said closed top of the cylindrical body.

8. A liquid purifier comprising a substantially cylindrical casing open at the top portion and defining a sump at the bottom portion thereof, means for closing off the top portion of said casing and providing inlet means into the interior of said casing and outlet means from said casing, a separator means disposed within said casing and comprising only three concentric wall portions, a first wall portion being spaced inwardly of said casing to define a shroud member and being closed at the top thereof to prevent entry of liquid passing through said inlet means into the upper portion of said shroud member whereby liquid entering through said inlet means passes downwardly in the space between said shroud member and said casing, a second one of said wall portions being spaced inwardly of said shroud member to define an annular flow passage between said second wall portion and said shroud member, said second wall portion being perforated, and the third wall portion being spaced inwardly of said second wall portion, said third wall portion being perforated and defining a hollow tubular means in communication with said outlet means, the closed top of said shroud member closing off the top of the annular space between said second and third wall portions, means closing off the bottom of the annular space between said second and third wall portions, closure means closing the bottom of said hollow tubular means, said second and third wall portions being substantially coextensive with one another in a longitudinal direction, and said shroud member extending to a point slightly below the lower portion of said second wall portion whereby incoming liquid flows downwardly between said casing and said first wall portion and then upwardly within said flow passage after changing direction abruptly so as to throw out impurities from the liquid stream to settle within said sump, and a bleed means providing communication between said sump and the interior of said hollow tubular means, said bleed means comprising an opening in said closure means having a cross sectional area substantially less than the area of said annular flow passage between said second wall portion and said shroud member, whereby the major portion of liquid passing through the apparatus passes through said annular flow passage between said second wall portion and the shroud member, and only a minor portion of the amount of liquid passing through the apparatus passes through said bleed means so as to produce a substantially steady continuous flow of liquid from the sump to the interior of said hollow tubular means for reducing turbulence in the sump.

9. Apparatus as defined in claim 8 including a filter element disposed between said second and third wall portions.

10. Apparatus as defined in claim 8 including means disposed in the space between said casing and said shroud member for imparting a swirling and rotative action to liquid flowing therethrough to increase its centrifugal action.

11. Apparatus as defined in claim 10 wherein said last-mentioned means comprises a resilient member coiled around the outer surface of said first wall portion in a downwardly spiral arrangement and extending between the outer surface of said first wall portion and the inner surface of said casing in a liquid-tight relationship to provide a downwardly winding flow path for liquid.

12. Apparatus as defined in claim 11 wherein said resilient member is substantially square in cross section and has its opposite ends tapered.

References Cited by the Examiner

UNITED STATES PATENTS

| | | | |
|---|---|---|---|
| 2,170,074 | 8/1939 | Hewitt | 210—130 X |
| 2,198,819 | 4/1940 | Holm | 210—304 |
| 2,298,321 | 10/1942 | Wells | 210—434 |
| 2,514,366 | 7/1950 | Bayland | 210—450 X |
| 2,642,188 | 6/1953 | Layte et al. | 210—442 |
| 2,995,250 | 8/1961 | Boewe et al. | 210—130 |
| 2,998,138 | 8/1961 | Mould et al. | 210—315 X |

FOREIGN PATENTS 521,702  2/1956  Canada.

REUBEN FRIEDMAN, *Primary Examiner.*

J. L. DECESARE, *Assistant Examiner.*